(12) United States Patent
Le

(10) Patent No.: US 10,213,003 B2
(45) Date of Patent: Feb. 26, 2019

(54) METHOD AND APPARATUS FOR NAIL CARE

(71) Applicant: Hau Le, San Antonio, TX (US)

(72) Inventor: Hau Le, San Antonio, TX (US)

( * ) Notice: Subject to any disclaimer, the term of this patent is extended or adjusted under 35 U.S.C. 154(b) by 0 days.

(21) Appl. No.: 14/698,415

(22) Filed: Apr. 28, 2015

(65) Prior Publication Data
US 2015/0320173 A1 Nov. 12, 2015

Related U.S. Application Data

(60) Provisional application No. 61/996,624, filed on May 12, 2014.

(51) Int. Cl.
| B32B 3/02 | (2006.01) |
| A45D 29/00 | (2006.01) |
| A45D 29/04 | (2006.01) |
| A45D 29/20 | (2006.01) |
| B32B 27/08 | (2006.01) |
| B32B 27/30 | (2006.01) |

(52) U.S. Cl.
CPC ........... *A45D 29/20* (2013.01); *A45D 29/007* (2013.01); *A45D 29/04* (2013.01); *B32B 3/02* (2013.01); *B32B 27/08* (2013.01); *B32B 27/302* (2013.01); *B32B 2439/00* (2013.01)

(58) Field of Classification Search
CPC ...... A45D 29/20; A45D 29/007; A45D 29/00; A45D 29/04; A45D 29/18; B32B 3/02; B32B 27/08; B32B 27/302; B32B 2439/00; B65D 21/0201; B65D 21/0204; B65D 21/0205; B65D 21/0208
See application file for complete search history.

(56) References Cited

U.S. PATENT DOCUMENTS

| 3,397,706 | A | * | 8/1968 | Hogan | A45D 29/20 |
| | | | | | 132/312 |
| 4,286,609 | A | * | 9/1981 | Miller | A45D 29/16 |
| | | | | | 132/75 |
| 6,264,619 | B1 | | 7/2001 | Ferguson | |
| 7,578,391 | B2 | * | 8/2009 | Nakamura | A61B 50/30 |
| | | | | | 206/223 |
| 2009/0266374 | A1 | * | 10/2009 | Bakke | A45D 29/20 |
| | | | | | 132/73.5 |
| 2010/0274205 | A1 | | 10/2010 | Morelli | |
| 2011/0073123 | A1 | * | 3/2011 | Ferrence | A45C 11/26 |
| | | | | | 132/73 |

(Continued)

Primary Examiner — Rachel R Steitz
(74) Attorney, Agent, or Firm — Justin D. Cook

(57) ABSTRACT

A nail care system designed for use in a manicure or pedicure process that is comprised of an assembly of disposable implements required for the manicure or pedicure process and a packaging system comprising individual sections. The individual sections of the packaging system are linked together in a chronological order necessary to complete a manicure or a pedicure, each individual section is adapted to hold and once sealed to sterilely secure a single chronologically ordered disposable implement of the assembly. The individual sections are separable from the packaging system and unsealable thereby providing access to a particular disposable implement secured therein when the particular disposable implement is required in accordance with the chronological ordering of the manicure or pedicure process.

7 Claims, 10 Drawing Sheets

(56) References Cited

U.S. PATENT DOCUMENTS

2011/0284017 A1* 11/2011 Nakamura ........... A45D 29/007
132/73
2013/0015095 A1* 1/2013 Carson ................... A61J 1/035
206/533

* cited by examiner

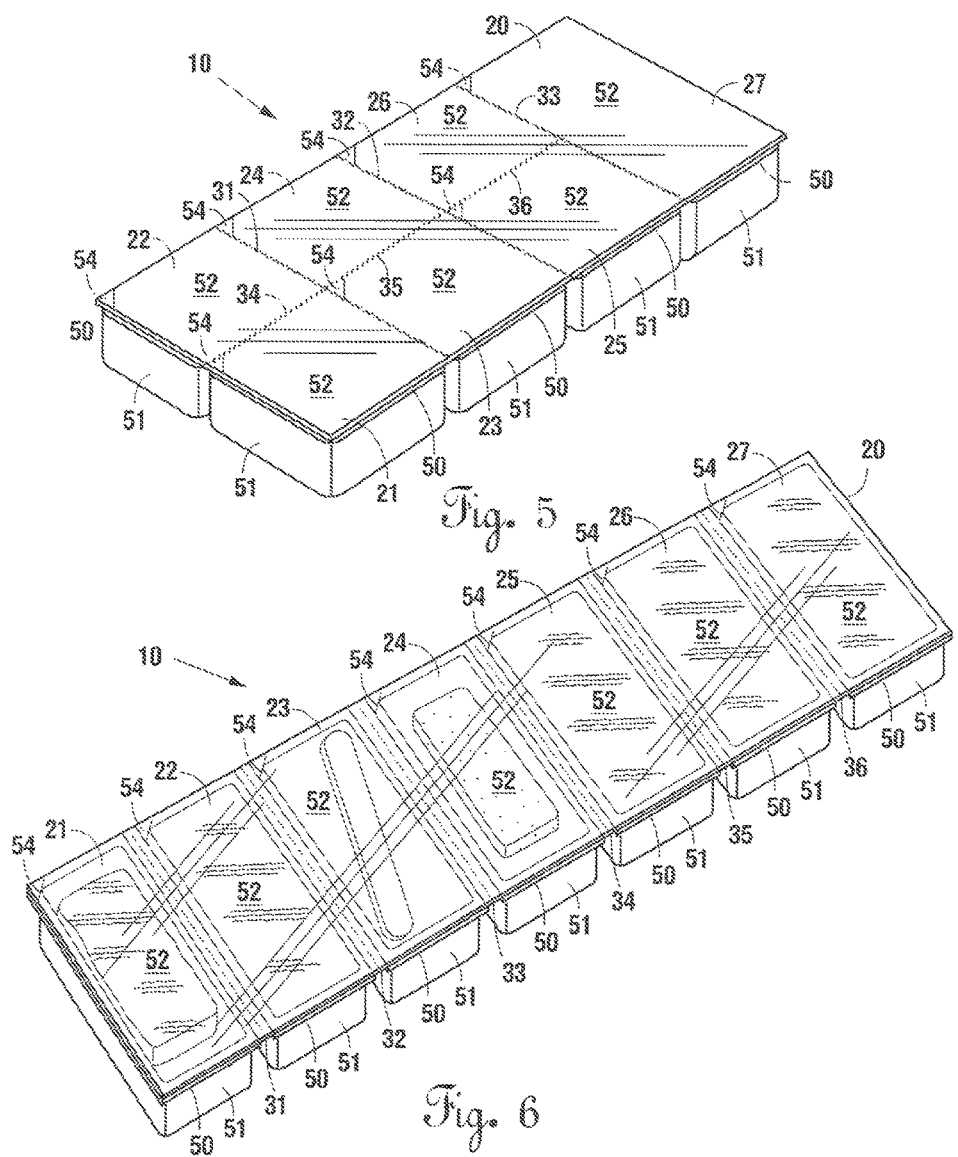

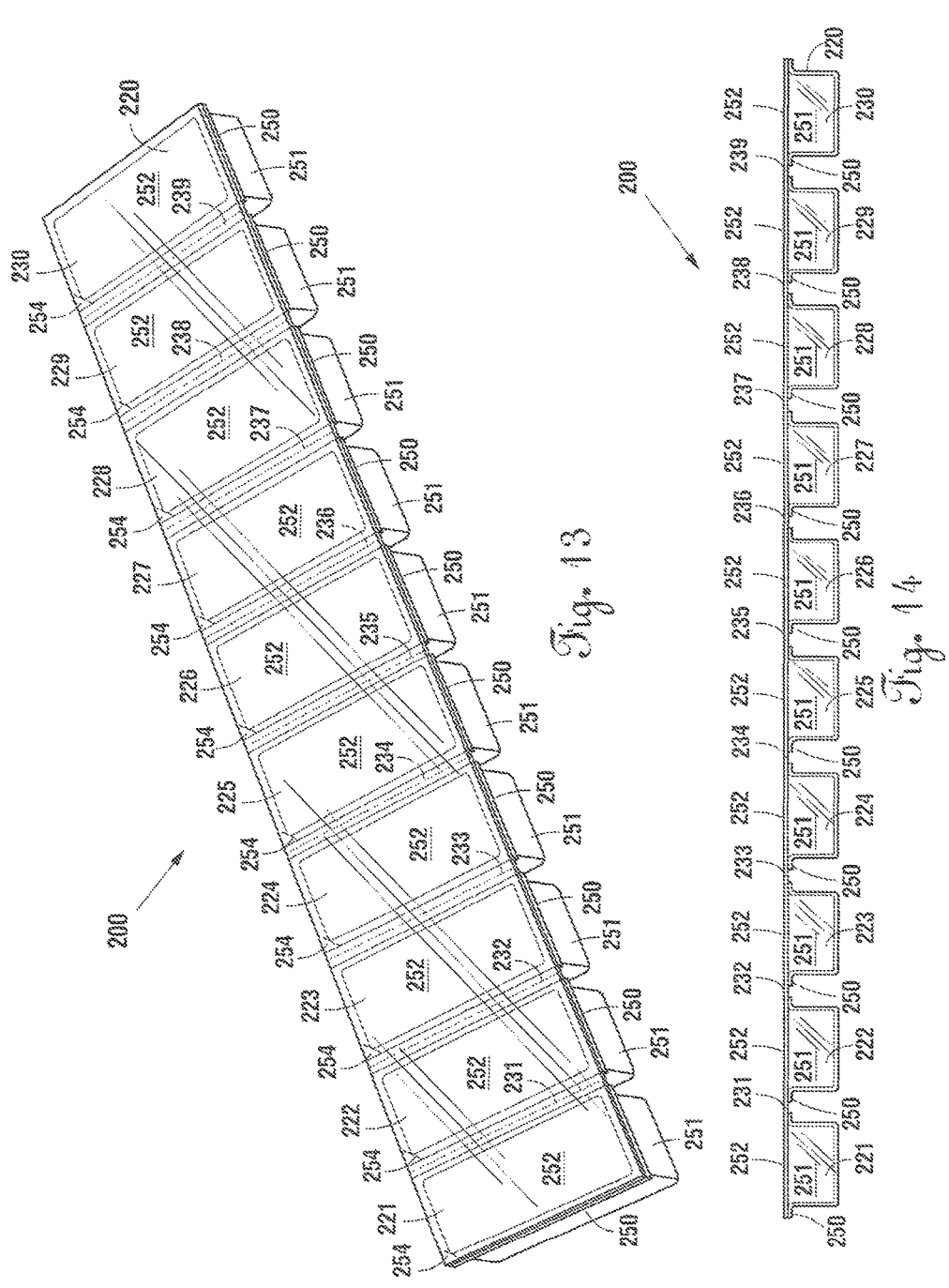

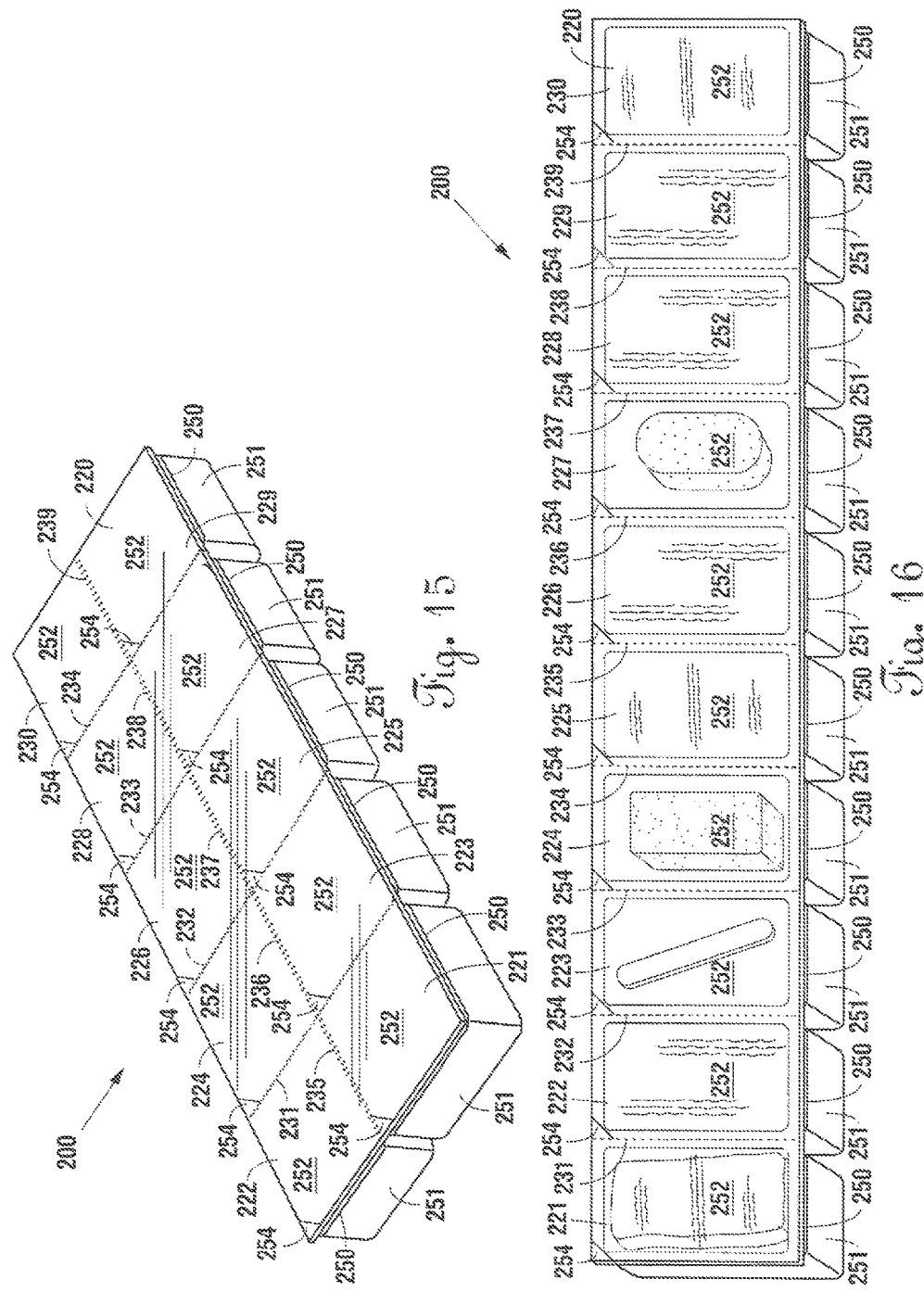

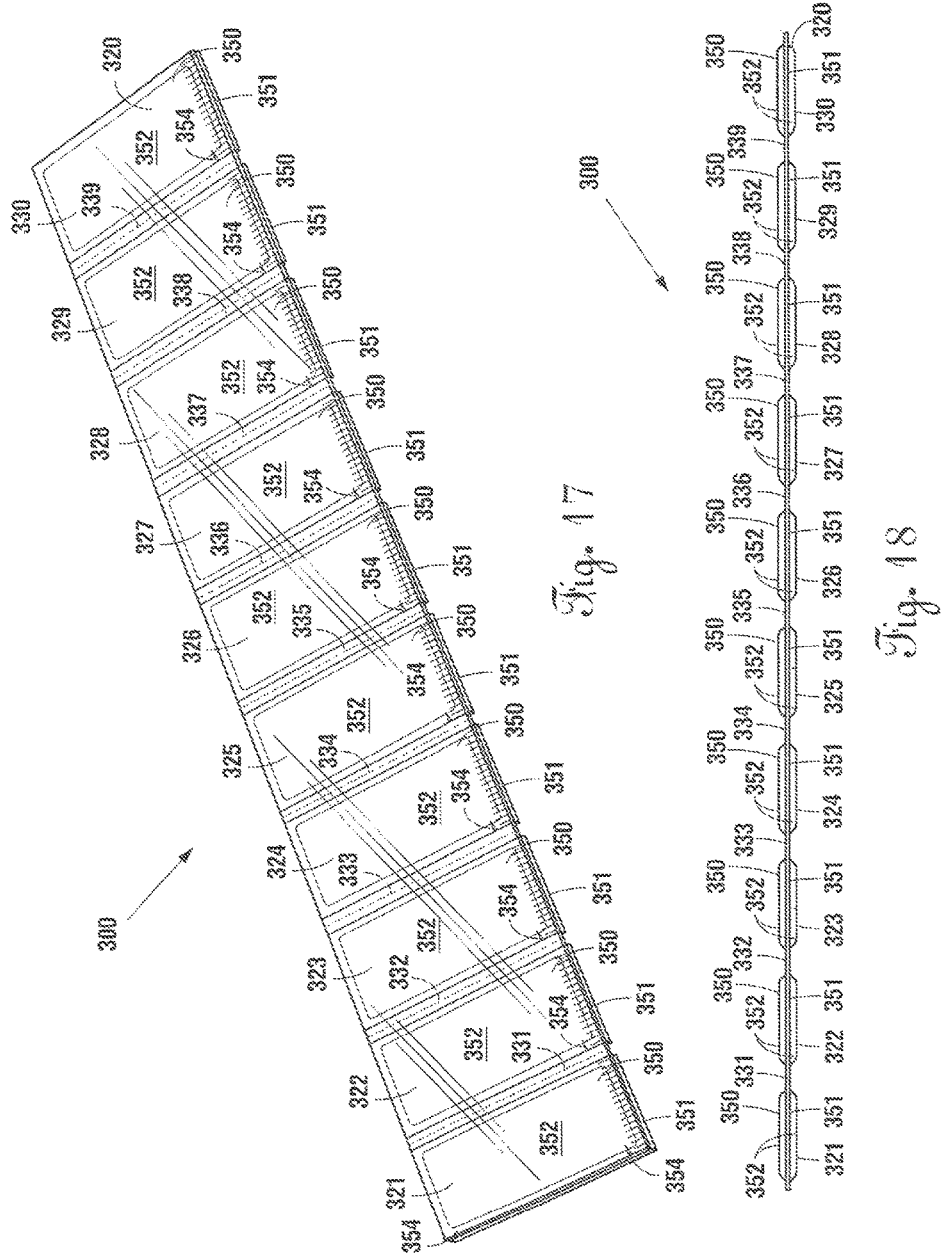

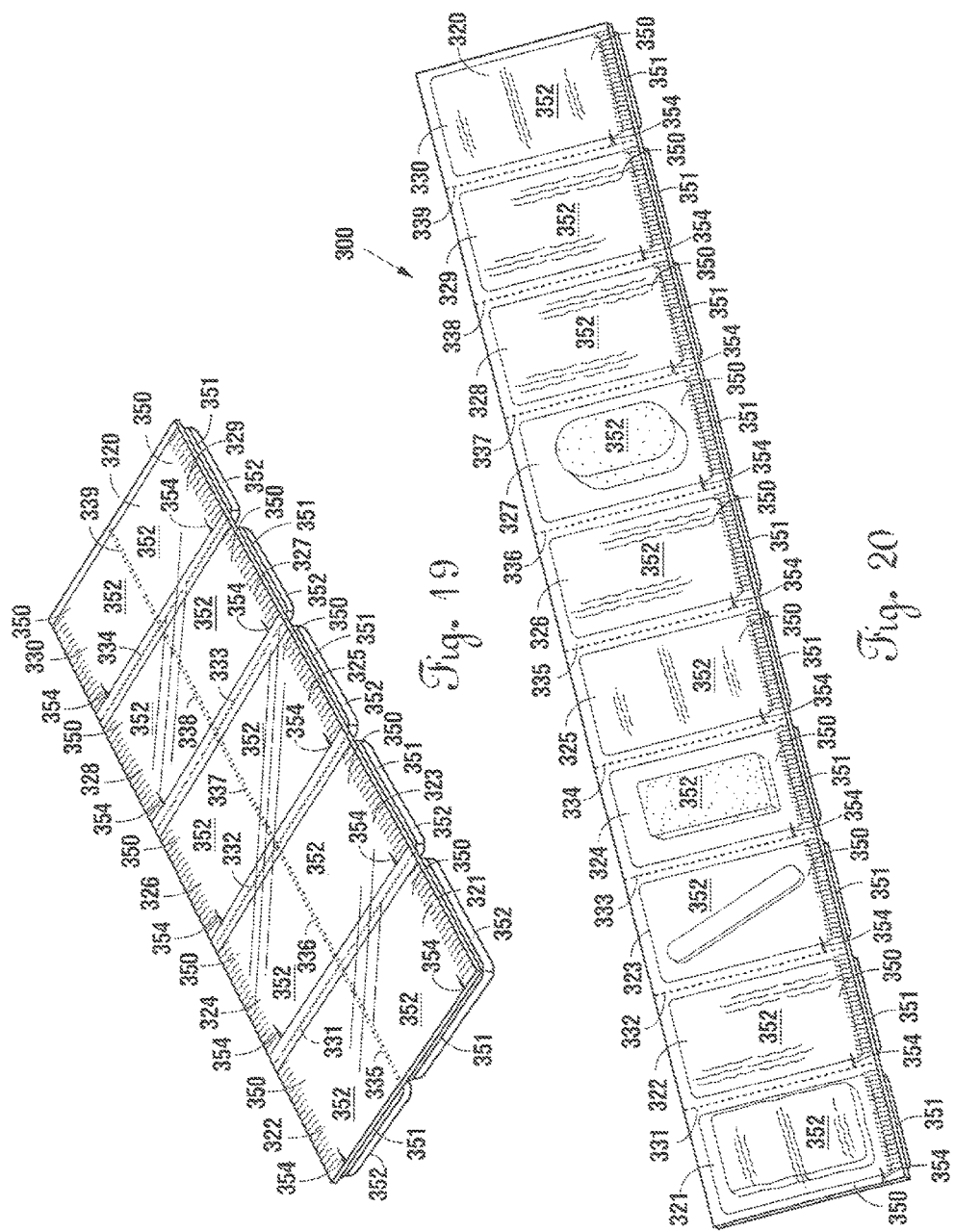

METHOD AND APPARATUS FOR NAIL CARE

CROSS-REFERENCE TO RELATED APPLICATION

This present application claims all available benefit, under 35 U.S.C. § 119(e), of U.S. provisional patent application Ser. No. 61/996,624 filed May 12, 2014. By this reference, the full disclosure of U.S. provisional patent application Ser. No. 61/996,624 is incorporated herein as though now set forth in its entirety.

BACKGROUND OF THE INVENTION

1. Field of the Invention

The present invention relates generally to manicure and pedicure systems and, more particularly, but not by way of limitation, to manicure and pedicure systems and a method of use thereof that lowers the risk that infections can be transmitted through cross-contamination.

2. Description of the Related Art

The transmission of infections, such as fungal, bacterial, and viral, is a concern for customers, nail technicians, and owner/operators of nail salons and spas. While the transmission of infections in nail salon and spas may occur in various ways, the transmission of infections through cross-contamination is common. Cross-contamination is the process by which bacteria or other microorganisms are unintentionally transferred with harmful effect from one substance or object to another. For example, if a particular tool or implement that is required in the manicure and pedicure process is used on multiple customers, this raises the risk that infections can be transmitted through cross-contamination.

Reducing the risk of cross-contamination is typically addressed through the use of autoclaves to clean and sterilize instruments such as nail clippers that are reused during the manicure and pedicure process. Autoclaves expose the instruments to high temperature steam for several minutes and are effective at neutralizing infections that can contaminate instruments thereby helping to prevent the transmission of these infections.

However, not all the tools used in the manicure and pedicure process can be autoclaved. Tools such as nail files (emery boards) and buffers cannot be autoclaved and in some establishments these tools are reused multiple times raising the risk of cross-contamination. In addition, the creams and lotions used in the manicure and pedicure process often come in large containers and are used on multiple customers also raising the risk that infections can be transmitted through cross-contamination.

Accordingly, a manicure and pedicure system and a method of use thereof that lowers the risk that infections will be transmitted through cross-contamination would be useful.

SUMMARY OF THE INVENTION

In accordance with a method and apparatus for nail care, a nail care system designed for use in a manicure or pedicure process is comprised of an assembly of disposable implements required for a manicure or pedicure and a packaging system comprising individual sections. The individual sections of the packaging system are linked together in a chronological order necessary to complete a manicure or a pedicure. Furthermore, each individual section is adapted to hold and once sealed to sterilely secure a single chronologically ordered disposable implement of the assembly. The individual sections are separable from the packaging system and unsealable. Unsealing the individual section provides access to a particular disposable implement secured therein when the particular disposable implement is required in accordance with the chronological ordering of the manicure or pedicure process.

In a first and second embodiment of the nail care system, the disposable implements for the manicure or pedicure process comprise nail polish remover, cuticle softener lotion, a nail file, a buffer stone, a cuticle oil, moisturizing lotion, and oil remover. To hold and secure these disposable implements, the packaging system comprises first through seventh individual sections, wherein: the first individual section includes the nail polish remover, the second individual section includes the cuticle softener lotion, the third individual section includes the nail file, the fourth individual section includes the buffer stone, the fifth individual section includes the cuticle oil, the sixth individual section includes the moisturizing lotion, and the seventh individual section includes the oil remover.

In a third and fourth embodiment of the nail care system, the disposable implements for a manicure or pedicure process comprise nail polish remover, cuticle softener lotion, a nail file, a buffer stone, a cuticle oil, callus remover lotion, pumice bar, exfoliation crème, moisturizing lotion, and oil remover. To hold and secure these disposable implements, the packaging system comprises first through tenth individual sections, wherein: the first individual section includes the nail polish remover, the second individual section includes the cuticle softener lotion, the third individual section includes the nail file, the fourth individual section includes the buffer stone, the fifth individual section includes the cuticle oil, the sixth individual section includes, the callus remover lotion, the seventh individual section includes the pumice bar, the eighth individual section includes the exfoliation crème, the ninth individual section includes the moisturizing lotion, and the tenth individual section includes the oil remover.

In the first and third embodiment of the nail care system, the packaging system is a packaging tray and the individual sections are compartments. The compartments comprise a container, a lip, and a cover. The container provides storage space and is adapted to hold any particular disposable implement useful in the manicure or pedicure process. The lip is formed integrally about the compartment, wherein the lip segregates one compartment from another and includes a perforation that allows a compartment to be separated from the packaging tray. The cover is adapted to seal a particular disposable implement within the compartment. Furthermore, the cover includes a tab that allows the cover to be opened from the compartment and a user to gain access to the particular disposable implement stored therein.

In the second and fourth embodiment of the nail care system, the packaging system is a packet system and the individual sections are packets. The packets comprise a cover and a border that form a pocket. The pocket provides a storage space and is adapted to hold any particular disposable implement useful in a manicure or pedicure process. The border segregates one packet from another and includes a perforation that allows the packet to be separated from the packet system. In addition, the border includes a tab that allows the cover to be opened and a user to gain access to the particular disposable implement stored within the pocket.

In a method of using the nail care system in a manicure or pedicure process, a nail technician separates from the packaging system a first individual section in the chronological order. Then the nail technician unseals the first individual section and removes the disposable implement secured therein. The disposable implement is then used in the manicure or pedicure process. After being used in the manicure or pedicure process the nail technician disposes of the disposable implement as well as the first individual section. The nail technician then sequentially performs with each next individual section the steps of separating, unsealing, removing, using, and disposing of implements as well as the individual sections until a final individual section remains. Upon reaching the final individual section, the nail technician unseals the final individual section, removes the disposable implement secured therein, uses the disposable implement in the manicure or pedicure process, and disposes of the disposable implement as well as the final individual section.

BRIEF DESCRIPTION OF DRAWINGS

FIG. 5 is a perspective view illustrating an alternative compartment configuration for the first embodiment of the nail care system.

FIG. 6 is a perspective view illustrating implements contained within the compartments of the first embodiment of the nail care system.

FIG. 13 is a perspective view illustrating a third embodiment of the nail care system.

FIG. 14 is a side view illustrating the third embodiment of the nail care system.

FIG. 15 is a perspective view illustrating an alternative compartment configuration for the third embodiment of the nail care system.

FIG. 16 is a perspective view illustrating implements contained within the compartments of the third embodiment of the nail care system.

FIG. 17 is a perspective view illustrating a fourth embodiment of the nail care system.

FIG. 18 is a side view illustrating the fourth embodiment of the nail care system.

FIG. 19 is a perspective view illustrating an alternative packet configuration for the fourth embodiment of the nail care system.

FIG. 20 is a perspective view illustrating implements contained within the packets of the fourth embodiment of the nail care system.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Figure 1:
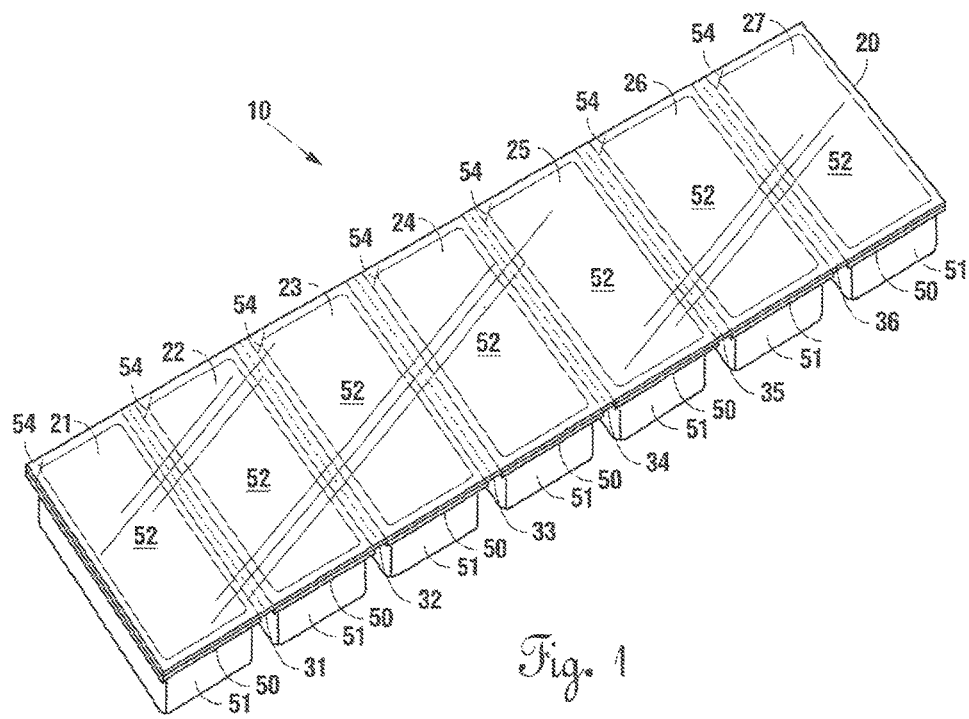
FIG. 1 is a perspective view illustrating a first embodiment of a nail care system.
Figure 2:
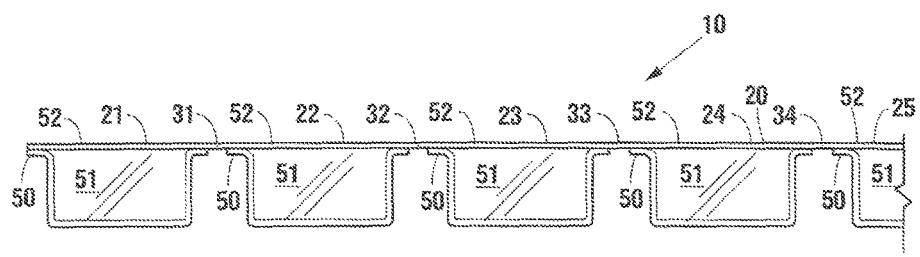
FIG. 2 is a side view illustrating the first embodiment of the nail care system.

FIGS. 1 and 2 illustrate a first embodiment of a nail care system 10 including a packaging tray 20. The nail care system 10 may be used in a manicure or pedicure process, however, in the first embodiment, the nail care system 10 will be employed in a manicure process. The packaging tray 20 can be made of any suitable material, such as polystyrene, polyethylene, and the like. The packaging tray 20 in the first embodiment is composed of individual compartments 21-27 that connect together to form the packaging tray 20. One of ordinary skill in the art will recognize that more or less compartments may be added or removed from the packaging tray 20 depending upon application. The compartments 21-27 store implements used in a manicure or pedicure process and each includes a lip 50, a container 51, and a cover 52. The lip 50, the container 51, and the cover 52 of the compartments 21-27 work in concert to hold and secure a particular implement required in the manicure process within one of the compartments 21-27. The compartments 21-27 may contain any implement that is useful in the manicure process such as a tool, cream, or oil. Furthermore, in the first embodiment of the nail care system 10, the compartments 21-27 as well as the manicure implements contained therein are disposable.

The containers 51 of the compartments 21-27 provide a storage space and are adapted to hold any particular disposable implement useful in a manicure or pedicure process. The containers 51 are made of any suitable material such as plastic that can hold solid materials as well as liquids. Furthermore, the containers 51 of the compartments 21-27 may be clear allowing a nail technician to see an implement contained within the compartments 21-27 or opaque allowing the labeling of the compartments 21-27.

Figure 3:
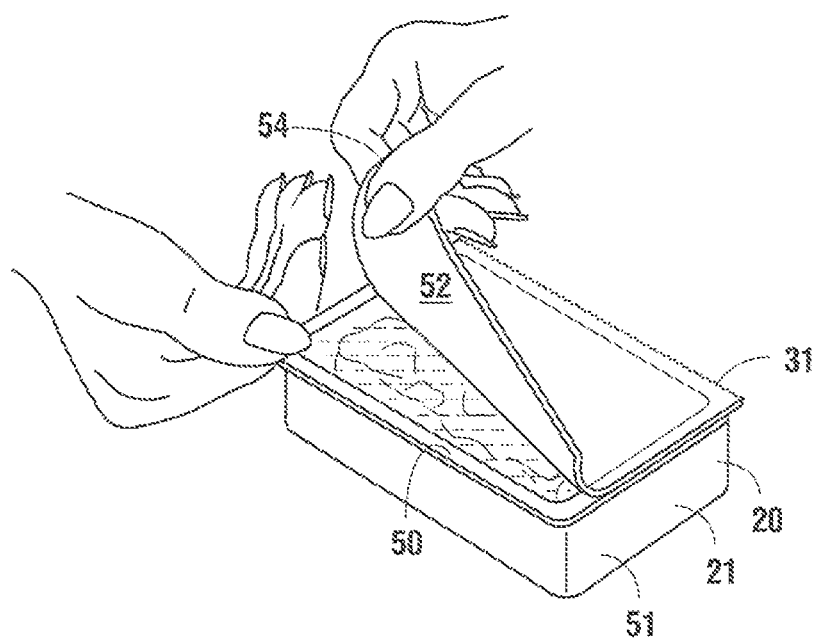
FIG. 3 is a perspective view illustrating the removal of a cover from a compartment of the first embodiment of the nail care system.

The covers 52 of the compartments 21-27 each include a tab 54 and secure to the lips 50 of the compartments 21-27 using any suitable means such as an adhesive or heat sealing. The tab 54 of the cover 52 allows a nail technician to remove the cover 52 from the lip 50 of a particular compartment 21-27. As illustrated in FIG. 3, to remove the cover 52 from the lip 50, a nail technician grasps the tab 54 and pulls away from the lip 50 to remove the cover 52 and allow the nail technician access to the implements contained within the container 51 of a particular compartment 21-27. The cover 52 is made of any suitable material such as plastic that can seal solid materials as well as liquids within the container 51 of the compartments 21-27. Furthermore, the cover 52 of the compartments 21-27 may be clear allowing a nail technician to see an implement contained within the compartments 21-27 or opaque allowing the labeling of the compartments 21-27.

Figure 4:
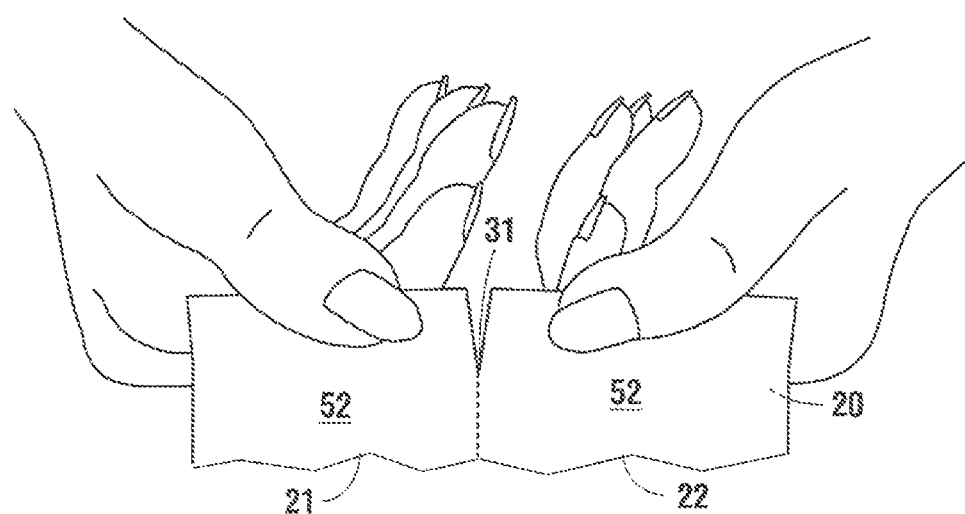
FIG. 4 is a top view illustrating the separation of a compartment from a packaging tray of the first embodiment of the nail care system.

The lips 50 of the compartments 21-27 segregate the various compartments 21-27 and connect at perforations 31-36. The segregation of the compartments 21-27 prevents implements contained within the compartments 21-27 from commingling during shipping or transport. The perforations 31-36 allow the compartments 21-27 to be separated from the packaging tray 20 and used when the particular implement contained therein is required in the manicure process. For example, as illustrated in FIG. 4, to separate the compartment 21 from the packaging tray 20, the nail technician would tear along the perforation 31 and remove the compartment 21 from the packaging tray 20.

The packaging tray 20 increases efficiency and decreases the time required to perform a manicure by ensuring that the nail technician has all disposable implements necessary in the manicure process in chronological order and readily available from the packaging tray 20. Specifically, the compartment 21 of the nail care system 10 is the first compartment used during the manicure process. When needed in the manicure process, the nail technician separates the compartment 21 along the perforation 31 from the packaging tray 20 and then opens the compartment 21 to access and employ the implement therein. The nail technician repeats the process of separating the remaining compartments 22-26 in chronological order from the packaging tray 20 along perforations 32-36 and employing the manicure implements contained therein until the compartment 27 is the only remaining compartment. Finally, the compartment 27 is opened and the implement therein is employed in the manicure process thereby completing the method and use of the first embodiment of the nail care system 10.

In addition to increasing the efficiency of the manicure process, the nail care system 10 also reduces the risk that infections will be transmitted through cross-contamination. As stated above, the compartments 21-27 as well as the implements contained therein are disposed of after they are used in the manicure process. This ensures that only one customer comes in contact with the nail care system 10, thereby eliminating re-use and thus reducing the risk that infections will occur through cross-contamination.

The packaging tray 20 of the nail care system 10 may be manufactured such that the compartments 21-27 and the manicure implements contained therein are sterile. For example, the packaging tray 20 can be manufactured and assembled in a clean room or exposed to UV radiation after the manufacturing process, thereby ensuring the packaging tray 20 and the manicure implements contained within the compartments 21-27 are sterile.

Although the compartments 21-27 in the first embodiment of the nail care system 10 are separated from the packaging tray 20 and used in chronological order, one of ordinary skill in the art will recognize that the compartments 21-27 may be separated and used in any order desired by the nail technician. Furthermore, FIG. 5 illustrates an alternate embodiment of the nail care system 10 wherein some of the compartments 21-27 are placed adjacent as well as front to back.

It should be understood that the packaging tray 20 of the nail care system 10 may be manufactured so that the compartments 21-27 include any implement that is useful in a manicure process. Nevertheless, as an illustrative example and shown in FIG. 6, the compartments 21-27 of the first embodiment of the nail care system 10 include a nail polish remover in compartment 21, a cuticle softener lotion in the compartment 22, a nail file in the compartment 23, a buffer stone in the compartment 24, cuticle oil in the compartment 25, moisturizing lotion in the compartment 26, and oil remover in the compartment 27. In the first embodiment of the nail care system 10, the compartments are of equal size in order to aid the manufacturing process, however, one of ordinary skill in the art would recognize that individual compartments 21-27 may be different sizes to include multiple implements, increased quantity of implements, or decreased quantity of implements depending upon application. For example, the size of the compartment 23 may be increased to include multiple nail files or the size of the compartment 27 may be increased or decreased to include a greater or lesser quantity of oil remover.

The compartment 21 includes a swab soaked in any suitable substance such as acetone that can remove nail polish present on a customer's nails. The compartment 22 includes a cuticle softener lotion that softens and conditions the customer's cuticles. The compartment 23 includes a nail file that is used to gently grind down and shape the edges of nails. The compartment 24 includes a buffer stone which smoothes and polishes the customer's nail. The compartment 25 includes cuticle oil that fortifies and strengthens a customer's nails. The compartment 26 includes massaging lotion that softens and moisturizes a customer's hands. The compartment 27 includes an oil remover that removes oils and other substances that would prevent nail polish from adhering to a customer's nail.

Described hereafter is the preferred method of using the first embodiment of the nail care system 10 in a manicure process to reduce the risk that infections are transmitted through cross-contamination. In a typical manicure process the nail technician preps the customer's hands and nails by soaking the customer's hands and nails in warm water and trimming the customer's nails to the appropriate shape and length. After prepping the customer's hands and nails, the nail technician is ready to use the nail care system 10 in the manicure process. The nail technician begins by taking hold of the packaging tray 20 and separating the compartment 21 along the perforation 31. The nail technician then grasps the tab 54 of the cover 52 and pulls away from the lip 50 to remove the cover 52 and allow the nail technician access to nail polish remover (acetone swab) contained within the compartment 21. The nail technician applies the nail polish remover (acetone swab) to the customer's nails removing any nail polish. Once the customer's nails are free of nail polish the nail technician will dispose of the nail polish remover (acetone swab) and the compartment 21.

Following the disposal of the nail polish remover and the compartment 21, the nail technician then takes hold of the packaging tray 20 and separates the compartment 22 along the perforation 32. After separating the compartment 22, the nail technician grasps the tab 54 of the cover 52 and pulls away from the lip 50 to remove the cover 52 and allow the nail technician access to the cuticle softener lotion contained within the compartment 22. The nail technician then applies the cuticle softener lotion to the customer's cuticles to soften them. Once the cuticle softener lotion has been applied, the nail technician will dispose of any remaining cuticle softener lotion and the compartment 22. In a typical manicure process after the application of the cuticle softener lotion, the nail technician removes any calluses or excess cuticles around the nail.

Once the nail technician has removed any calluses or excess cuticles the nail technician is ready to continue the use of the nail care system 10 in the manicure process. The nail technician continues by taking hold of the packaging tray 20 and separating the compartment 23 along the perforation 33. After separating the compartment 23, the nail technician grasps the tab 54 of the cover 52 and pulls away from the lip 50 to remove the cover 52 and allow the nail technician access to the nail file contained within the compartment 23. The nail technician removes the nail file and uses it to shape and smooth the edges of the customer's nails. After smoothing and shaping the edges of the customer's nails, the nail technician disposes of the nail file and the compartment 23.

Following the disposal of the nail file and the compartment 23, the nail technician takes hold of the packaging tray 20 and separates the compartment 24 along the perforation 34. After separating the compartment 24, the nail technician grasps the tab 54 of the cover 52 and pulls away from the lip 50 to remove the cover 52 and allow the nail technician access to the buffer stone contained within the compartment 24. The nail technician removes the buffer stone and uses it to buff the customer's nails in order to prepare them for later application of nail polish. Once the buffing of the customer's nails is complete, the nail technician disposes of the buffer stone and the compartment 24.

After disposing of the buffer stone and the compartment 24, the nail technician takes hold of the packaging tray 20 and separates the compartment 25 along the perforation 35. Once the compartment 25 separates from the packaging tray 20, the nail technician grasps the tab 54 of the cover 52 and pulls away from the lip 50 to remove the cover 52 and allow the nail technician access to the cuticle oil contained within the compartment 25. The nail technician applies the cuticle oil to the customer's cuticles to fortify and strengthen the customer's cuticles. After applying cuticle oil to the customer's nails the nail technician will dispose of any remaining cuticle oil and the compartment 25.

Following the disposal of the compartment 25, the nail technician takes hold of the packaging tray 20 and separates the compartment 26 along the perforation 36. After separating the compartment 26, the nail technician grasps the tab 54 of the cover 52 and pulls away from the lip 50 to remove the cover 52 and allow the nail technician access to the moisturizing lotion contained within the compartment 26. The nail technician applies the moisturizing lotion to the customer's hands to hydrate and soften the customer's hands. Subsequent to applying moisturizing lotion to the customer's hands, the nail technician disposes of any remaining moisturizing lotion and the compartment 26.

After the nail technician disposes of the compartment 26, the nail technician opens the remaining compartment 27 by grasping the tab 54 of the cover 52 and pulling away from the lip 50 to remove the cover 52 and allow the nail technician access to the oil remover contained within the compartment 27. The nail technician applies the oil remover to the customer's nails to remove oils and aid nail polish in adhering to the customer's nails. Once the oil remover is applied, the nail technician disposes of any remaining oil remover and the compartment 27, thereby completing the method and use of the first embodiment of the nail care system 10.

Although not required, an additional step may be performed in the manicure or pedicure process in which nail polish is added to the customer's nails after the application of oil remover. Furthermore, although the first embodiment describes a packaging tray 20 comprising individual compartments 21-27 that store the manicure implements, any packaging system that comprises individual sections may be used.

Figure 7:
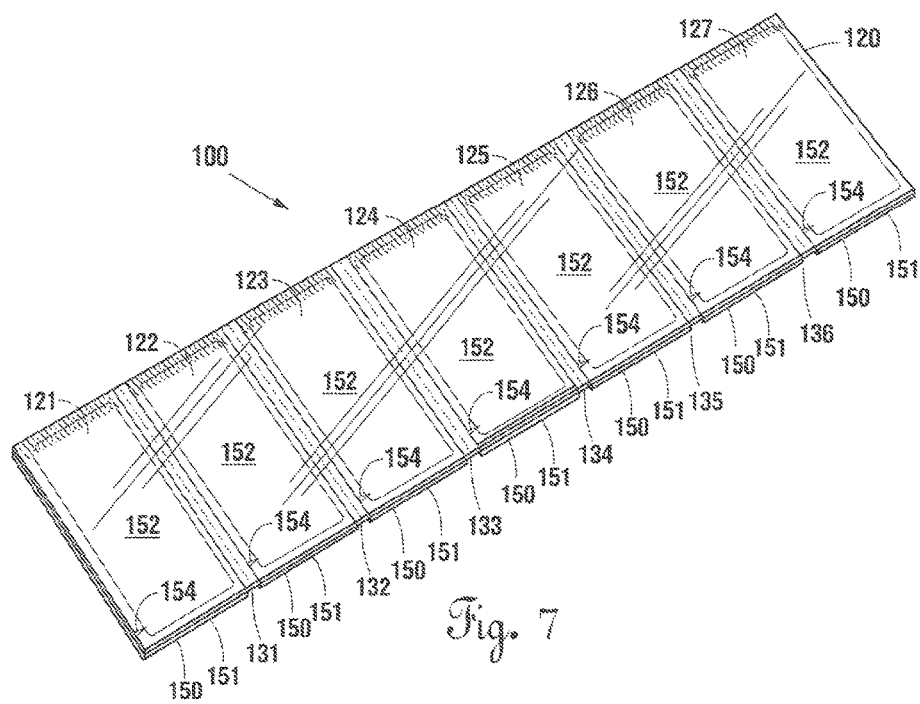
FIG. 7 is a perspective view illustrating a second embodiment of the nail care system.
Figure 8:
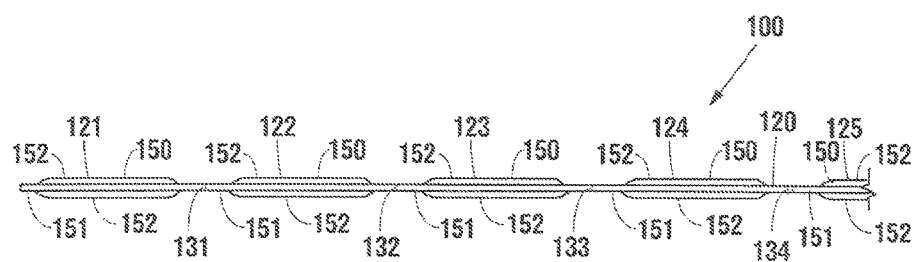
FIG. 8 is a side view illustrating the second embodiment of the nail care system.

FIGS. 7 and 8 illustrate a second embodiment of a nail care system 100 including a packet system 120. The nail care system 100 may be used in a manicure or pedicure process, however, in the second embodiment, the nail care system 100 will be employed in a manicure process. The packet system 120 in the second embodiment is composed of individual packets 121-127 that connect together to form the packet system 120. One of ordinary skill in the art will recognize that more or less packets may be added or removed from the packet system 120 depending upon application. The packets 121-127 store implements used in a manicure or pedicure process and each includes a cover 150 and a border 151. The cover 150 and the border 151 form a pocket 152 which holds and secures a particular implement required in the manicure process within one of the packets 121-127. The packets 121-127 may contain any implement that is useful in the manicure process such as a tool, cream, or oil. Furthermore, in the second embodiment of the nail care system 100, the packets 121-127 as well as the manicure implements contained therein are disposable.

The covers 150 of the packets 121-127 are made of any suitable material such as plastic that can seal solid materials as well as liquids within the pocket 152 of the packets 121-127. Furthermore, the covers 150 of the packets 121-127 may be clear allowing a nail technician to see an implement contained within the packets 121-127 or opaque allowing the labeling of the packets 121-127.

Figure 9:
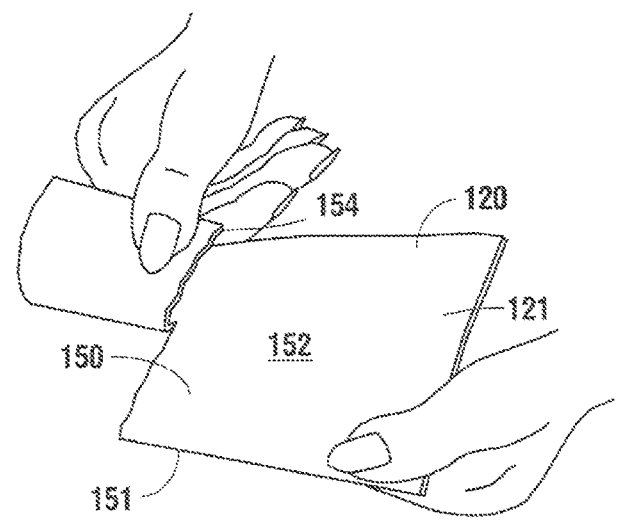
FIG. 9 is a perspective view illustrating the opening of a packet of the second embodiment of the nail care system.

The borders 151 of the packets 121-127 separate the various packets 121-127. In particular, the packets 121-127 of the packaging system 120 are individually sealed at the borders 151 and connect at perforations 131-136. Individually sealing the packets 121-127 at the borders 151 segregates the various pockets 152 of the packets 121-127. The segregation of the pockets 152 prevents implements contained within the packets 121-127 from commingling during shipping or transport. In addition, the borders 151 of the packets 121-127 each include a tab 154 that allows a nail technician to open a particular packet 121-127. As illustrated in FIG. 9, to open the packets 121-127, a nail technician grasps the tab 154 and pulls away from the border 151 to open the packets 121-127 and allow the nail technician access to the implements contained within the pocket 152 of a particular packet 121-127.

Figure 10:
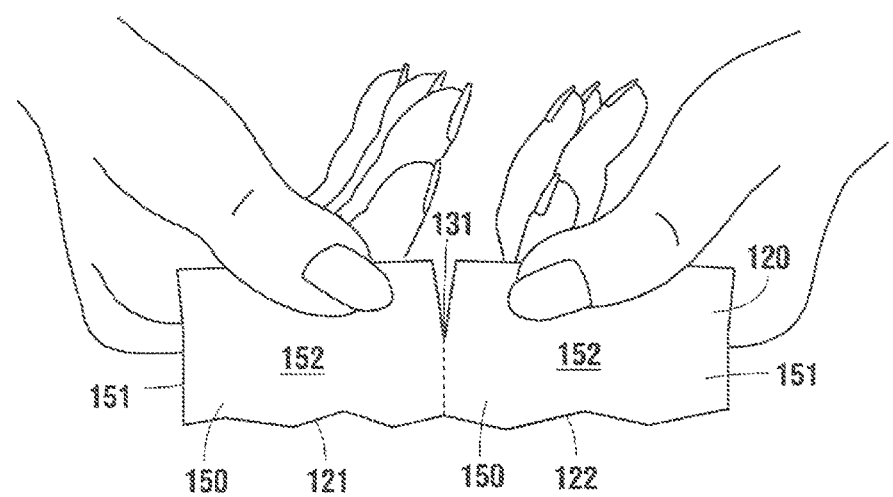
FIG. 10 is a top view illustrating the separation of a packet from a packet system of the second embodiment of the nail care system.

The perforations 131-136 allow the packets 121-127 to be separated from the packet system 120 and used when the particular implement contained therein is required in the manicure process. For example, as illustrated in FIG. 10, to separate the packet 121 from the packet system 120, the nail technician would tear along the perforation 131 and remove the packet 121 from the packet system 120.

The packet system 120 increases efficiency and decreases the time required to perform a manicure by ensuring that the nail technician has all disposable implements necessary in the manicure process in chronological order and readily available from the packet system 120. Specifically, the packet 121 of the nail care system 100 is the first packet used during the manicure process. When needed in the manicure process, the nail technician separates the packet 121 along the perforation 131 from the packet system 120 and then opens the packet 121 to access and employ the implement therein. The nail technician repeats the process of separating the remaining packets 122-126 in chronological order from the packet system 120 along perforations 132-136 and employing the manicure implements contained therein until the packet 127 is the only remaining packet. Finally, the packet 127 is opened and the implement therein is employed in the manicure process thereby completing the method and use of the second embodiment of the nail care system 100.

In addition to increasing the efficiency of the manicure process, the second embodiment of the nail care system 100 also reduces the risk that infections will be transmitted through cross-contamination. As stated above, the packets 121-127 as well as the implements contained therein are disposed of after they are used in the manicure process. This ensures that only one customer comes in contact with the second embodiment of the nail care system 100, thereby eliminating re-use and thus reducing the risk that infections will occur through cross-contamination.

The packet system 120 of the nail care system 100 may be manufactured such that the packets 121-127 and the manicure implements contained therein are sterile. For example, the packet system 120 can be manufactured and assembled in a clean room or exposed to UV radiation after the manufacturing process, thereby ensuring the packet system 120 and the manicure implements contained within the packets 121-127 are sterile.

Figure 11:
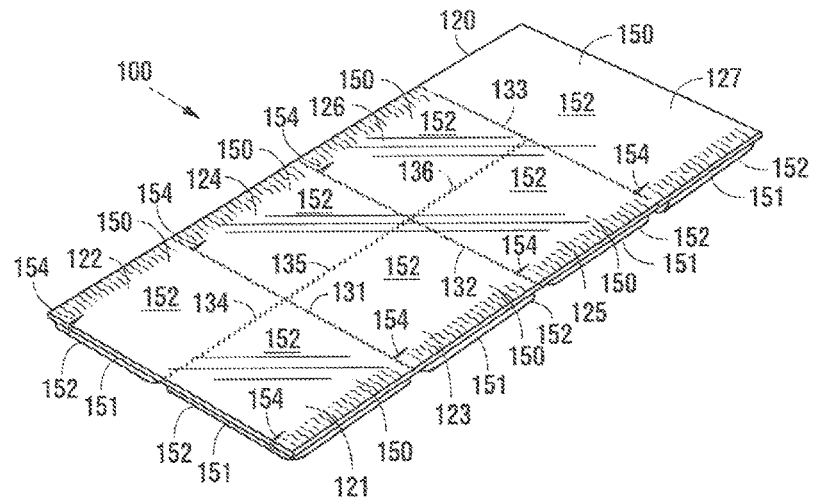
FIG. 11 is a perspective view illustrating an alternative packet configuration for the second embodiment of the nail care system.

Although the packets 121-127 in the second embodiment of the nail care system 100 are separated from the packet system 120 and used in chronological order, one of ordinary skill in the art will recognize that the packets 121-127 may be separated and used in any order desired by the nail technician. Furthermore, FIG. 11 illustrates an alternate embodiment of the nail care system 100 wherein the some of the packets 121-127 are placed adjacent as well as front to back.

Figure 12:
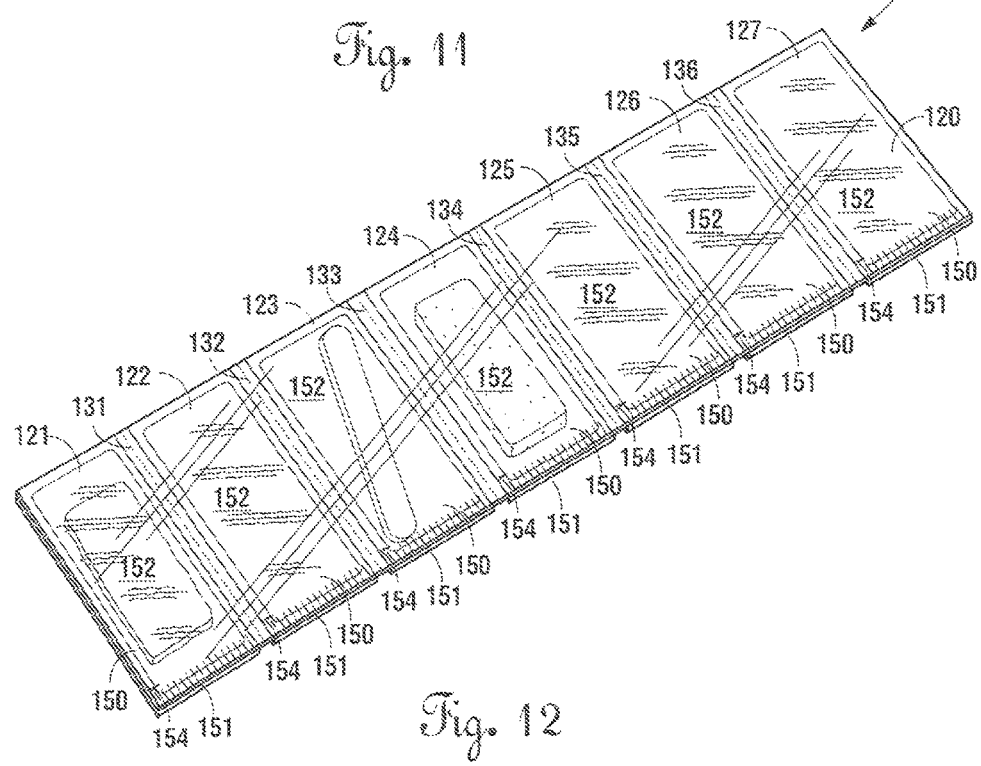
FIG. 12 is a perspective view illustrating implements contained within the packets of the second embodiment of the nail care system.

It should be understood that the packet system 120 of the nail care system 100 may be manufactured so that the packets 121-127 include any implement that is useful in a manicure process. Nevertheless, as an illustrative example and shown in FIG. 12, the packets 121-127 of the second embodiment of the nail care system 100 include a nail polish remover in packet 121, a cuticle softener lotion in the packet 122, a nail file in the packet 123, a buffer stone in the packet 124, cuticle oil in the packet 125, moisturizing lotion in the packet 126, and oil remover in the packet 127. In the second embodiment of the nail care system 100, the packets 121-127 are of equal size in order to aid the manufacturing process, however, one of ordinary skill in the art would recognize that the packets 121-127 and their corresponding pockets 152 may be different sizes to include multiple implements, increased quantity of implements, or decreased quantity of implements depending upon application. For example, the size of the packet 123 may be increased in size to include multiple nail files or the size of the packet 127 may be increased or decreased to include a greater or lesser quantity of oil remover.

The packet 121 includes a swab soaked in any suitable substance such as acetone that can remove nail polish present on a customer's nails. The packet 122 includes a cuticle softener lotion that softens and conditions the customer's cuticles. The packet 123 includes a nail file that is used to gently grind down and shape the edges of nails. The packet 124 includes a buffer stone which smoothes and polishes the customer's nail. The packet 125 includes cuticle oil that fortifies and strengthens a customer's nails. The packet 126 includes massaging lotion that softens and moisturizes a customer's hands. The packet 127 includes an oil remover that removes oils and other substances that would prevent nail polish from adhering to a customer's nail.

Described hereafter is the preferred method of using the second embodiment of the nail care system 100 in a manicure process to reduce the risk that infections are transmitted through cross-contamination. In a typical manicure process the nail technician preps the customer's hands and nails by soaking the customer's hands and nails in warm water and trimming the customer's nails to the appropriate shape and length. After prepping the customer's hands and nails, the nail technician is ready to use the nail care system 100 in the manicure process. The nail technician begins by taking hold of the packet system 120 and separating the packet 121 along the perforation 131.

The nail technician grasps the tab 154 of the packet 121 and pulls away from the border 151 to open the packet 121 and allow the nail technician access to nail polish remover (acetone swab) contained within the packet 121. The nail technician applies the nail polish remover (acetone swab) to the customer's nails removing any nail polish. Once the customer's nails are free of nail polish the nail technician disposes of the nail polish remover (acetone swab) and the packet 121.

Following the disposal of the nail polish remover and the packet 121, the nail technician then takes hold of the packet system 120 and separates the packet 122 along the perforation 132. After separating the packet 122, the nail technician grasps the tab 154 of the packet 122 and pulls away from the border 151 to open the packet 122 and allow the nail technician access to the cuticle softener lotion contained within the packet 122. The nail technician applies the cuticle softener lotion to the customer's cuticles to soften them. Once the cuticle softener lotion has been applied, the nail technician will dispose of the cuticle softener lotion and the packet 122. In a typical manicure process after the application of the cuticle softener lotion, the nail technician removes any calluses or excess cuticles around the nail.

Once the nail technician has removed any calluses or excess cuticles the nail technician is ready to continue the use of the nail care system 10 in the manicure process. The nail technician continues by taking hold of the packet system 120 and separating the packet 123 along the perforation 133. After separating the packet 123, the nail technician grasps the tab 154 of the packet 123 and pulls away from the border 151 to open the packet 123 allowing the nail technician access to the nail file contained within the packet 123. The nail technician removes the nail file and uses it to shape and smooth the edges of the customer's nails. After smoothing and shaping the edges of the customer's nails, the nail technician will dispose of the nail file and the packet 123.

Following the disposal of the nail file and the packet 123, the nail technician takes hold of the packet system 120 and separates the packet 124 along the perforation 134. After separating the packet 124, the nail technician grasps the tab 154 of the packet 124 and pulls away from the border 151 to open the packet 124 and allow the nail technician access to the buffer stone contained within the packet 124. The nail technician removes the buffer stone and uses it to buff the customer's nails in order to prepare them for later application of nail polish. Once the buffing of the customer's nails is complete, the nail technician disposes of the buffer stone and packet 124.

After disposing of the buffer stone and the packet 124, the nail technician takes hold of the packet system 120 and separates the packet 125 along the perforation 135. Once the packet 125 separates from the packet system 120, the nail technician grasps the tab 154 of the packet 124 and pulls away from the border 151 to open the packet 124 and allow the nail technician access to the cuticle oil contained within the packet 125. The nail technician applies the cuticle oil to the customer's cuticles to fortify and strengthen the customer's cuticles. After applying cuticle oil to the customer's nails the nail technician will dispose of any remaining cuticle oil and the packet 125.

Following the disposal of the packet 125, the nail technician takes hold of the packet system 120 and separates the packet 126 along the perforation 136. After separating the packet 126, the nail technician grasps the tab 154 of the packet 126 and pulls away from the border 151 to open the packet 126 and allow the nail technician access to the moisturizing lotion contained within the packet 126. The nail technician applies the moisturizing lotion to the customer's hands to hydrate and soften the customer's hands. After applying moisturizing lotion to the customer's hands, the nail technician will dispose of any remaining moisturizing lotion and the packet 126.

After the nail technician disposes of the packet 126, the nail technician opens the remaining packet 127 by grasping the tab 154 of the packet 127 and pulls away from the border 151 to open the packet 127 and allow the nail technician access to the oil remover contained within the packet 127. The nail technician applies the oil remover to the customer's nails to remove oils and aid nail polish in adhering to the customer's nails. After applying oil remover to the customer's nails the nail technician will dispose of any remaining oil remover and the packet 127, thereby completing the method and use of the second embodiment of the nail care system 100.

Although not required, an additional step may be performed in the manicure or pedicure process in which nail polish is added to the customer's nails after the application of oil remover. Furthermore, although the second embodiment describes a packet system 120 comprising individual packets 121-127 that store the manicure implements, any packaging system that comprises individual sections may be used.

FIGS. 13 and 14 illustrate a third embodiment of a nail care system 200 including a packaging tray 220. The nail care system 200 may be used in a manicure or pedicure process, however, in the third embodiment, the nail care system 200 will be employed in a pedicure process. The packaging tray 220 can be made of any suitable material, such as polystyrene, polyethylene, and the like. The packaging tray 220 in the third embodiment is composed of individual compartments 221-230 that connect together to form the packaging tray 220. One of ordinary skill in the art will recognize that more or less compartments may be added or removed from the packaging tray 220 depending upon application. The compartments 221-230 store implements used in a manicure or pedicure process and each includes a lip 250, a container 251, and a cover 252. The lip 250, the container 251, and the cover 252 of the compartments 221-230 work in concert to hold and secure a particular implement required in the pedicure process within one of the compartments 221-230. The compartments 221-230 may contain any implement that is useful in the pedicure process such as a tool, cream, or oil. Furthermore, in the third embodiment of the nail care system 200, the compartments 221-230 as well as the pedicure implements contained therein are disposable.

The containers 51 of the compartments 21-27 provides a storage space and are adapted to hold any particular disposable implement useful in a manicure or pedicure process. The containers 51 are made of any suitable material such as plastic that can hold solid materials as well as liquids. Furthermore, the containers 51 of the compartments 21-27 may be clear allowing a nail technician to see an implement contained within the compartments 21-27 or opaque allowing the labeling of the compartments 21-27.

The covers 252 of the compartments 221-230 each include a tab 254 and secure to the lips 250 of the compartments 221-230 using any suitable means such as an adhesive or heat sealing. The tab 254 of the cover 252 allows a nail technician to remove the cover 252 from the lip 250 of a particular compartment 221-230. To remove the cover 252 from the lip 250, a nail technician grasps the tab 254 and pulls away from the lip 250 to remove the cover 252 and allow the nail technician access to the implements contained within the container 251 of a particular compartment 221-230 (identical to FIG. 3 in the first embodiment of the nail care system 10). The cover 252 is made of any suitable material such as plastic that can seal solid materials as well as liquids within the container 251 of the compartments 221-230. Furthermore, the cover 252 of the compartments 221-230 may be clear allowing a nail technician to see an implement contained within the compartments 221-230 or opaque allowing the labeling of the compartments 221-230.

The lips 250 of the compartments 221-230 segregate the various compartments 221-230 and connect at perforations 231-239. The segregation of the compartments 221-230 prevents implements contained within the compartments 221-230 from commingling during shipping or transport. The perforations 231-239 allow the compartments 221-230 to be separated from the packaging tray 220 and used when the particular implement contained therein is required in the pedicure process. To separate the compartment 221 from the packaging tray 220, the nail technician would tear along the perforation 231 and remove the compartment 221 from the packaging tray 220 (identical to FIG. 4 in the first embodiment of the nail care system 10).

The packaging tray 220 increases efficiency and decreases the time required to perform a pedicure by ensuring that the nail technician has all disposable implements necessary in the pedicure process in chronological order and readily available from the packaging tray 220. Specifically, the compartment 221 of the nail care system 200 is the first compartment used during the pedicure process. When needed in the pedicure process, the nail technician separates the compartment 221 along the perforation 231 from the packaging tray 220 and then opens the compartment 221 to access and employ the implement therein. The nail technician repeats the process of separating the remaining compartments 222-229 in chronological order from the packaging tray 220 along perforations 232-239 and employing the pedicure implements contained therein until the compartment 230 is the only remaining compartment. Finally, the compartment 230 is opened and the implement therein is employed in the pedicure process thereby completing the method and use of the third embodiment of the nail care system 200.

In addition to increasing the efficiency of the pedicure process, the nail care system 200 also reduces the risk that infections will be transmitted through cross-contamination. As stated above, the compartments 221-231 as well as the implements contained therein are disposed of after they are used in the pedicure process. This ensures that only one customer comes in contact with the nail care system 200, thereby eliminating re-use and thus reducing the risk that infections will occur through cross-contamination.

The packaging tray 220 of the nail care system 200 may be manufactured such that the compartments 221-231 and the pedicure implements contained therein are sterile. For example, the packaging tray 220 can be manufactured and assembled in a clean room or exposed to UV radiation after the manufacturing process, thereby ensuring the packaging tray 220 and the pedicure implements contained within the compartments 221-231 are sterile.

Although the compartments 221-231 in the third embodiment of the nail care system 200 are separated from the packaging tray 220 and used in chronological order, one of ordinary skill in the art will recognize that the compartments 221-231 may be separated and used in any order desired by the nail technician. Furthermore, FIG. 15 illustrates an alternate embodiment of the nail care system 200 wherein the compartments 221-230 are placed side by side.

It should be understood that the packaging tray 220 of the nail care system 200 may be manufactured so that the compartments 221-231 include any implement that is useful in a pedicure process. Nevertheless, as an illustrative example and shown in FIG. 16, the compartments 221-231 of the third embodiment of the nail care system 200 include a nail polish remover in compartment 221, a cuticle softener lotion in the compartment 222, a nail file in the compartment 223, a buffer stone in the compartment 224, cuticle oil in the compartment 225, callus remover lotion in the compartment 226, a pumice bar in the compartment 227, exfoliation crème in the compartment 228, lotion in the compartment 229, and oil remover in the compartment 230. In the third embodiment of the nail care system 200, the compartments are of equal size in order to aid the manufacturing process, however, one of ordinary skill in the art would recognize that individual compartments 221-230 may be different sizes to include multiple implements, increased quantity of implements, or decreased quantity of implements depending upon application. For example, the size of the compartment 223 may be increased to include multiple nail files or the size of the compartment 230 may be increased or decreased to include a greater or lesser quantity of oil remover.

The compartment 221 includes a swab soaked in any suitable substance such as acetone that can remove nail polish present on a customer's nails. The compartment 222 includes a cuticle softener lotion that softens and conditions the customer's cuticles. The compartment 223 includes a nail file that is used to gently grind down and shape the edges of nails. The compartment 224 includes a buffer stone which smoothes and polishes the customer's nails. The compartment 225 includes cuticle oil that fortifies and strengthens a customer's nails. The compartment 226 includes callus remover lotion that facilitates the removal of calluses on a customer's feet. The compartment 227 includes the pumice bar that helps to remove any remaining calluses on the customer's feet after application of the callus remover lotion. The compartment 228 includes exfoliation crème that helps to soften a customer's feet. The compartment 229 includes massaging lotion that softens and moisturizes a customer's feet. The compartment 230 includes an oil remover that removes oils and other substances that would prevent nail polish from adhering to a customer's nail.

Described hereafter is the preferred method of using the third embodiment of the nail care system 200 in a pedicure process to reduce the risk that infections are transmitted through cross-contamination. In a typical pedicure process the nail technician preps the customer's feet and nails by soaking the customer's feet and nails in warm water and trimming the customer's nails to the appropriate shape and length. After prepping the customer's feet and nails, the nail technician is ready to use the nail care system 200 in the pedicure process. The nail technician begins by taking hold of the packaging tray 220 and separating the compartment 221 along the perforation 231. The nail technician then grasps the tab 254 of the cover 252 and pulls away from the lip 250 to remove the cover 252 and allow the nail technician access to nail polish remover (acetone swab) contained within the compartment 221. The nail technician applies the nail polish remover (acetone swab) to the customer's nails removing any nail polish. Once the customer's nails are free of nail polish the nail technician will dispose of the nail polish remover (acetone swab) and the compartment 221.

Following the disposal of the nail polish remover and the compartment 221, the nail technician then takes hold of the packaging tray 220 and separates the compartment 222 along the perforation 232. After separating the compartment 222, the nail technician grasps the tab 254 of the cover 252 and pulls away from the lip 250 to remove the cover 252 and allow the nail technician access to the cuticle softener lotion contained within the compartment 222. The nail technician then applies the cuticle softener lotion to the customer's cuticles to soften them. Once the cuticle softener lotion has been applied, the nail technician will dispose of any remaining cuticle softener lotion and the compartment 222. In a typical pedicure process after the application of the cuticle softener lotion, the nail technician removes any calluses or excess cuticles around the nail.

Once the nail technician has removed any calluses or excess cuticles the nail technician is ready to continue the use of the nail care system 200 in the pedicure process. The nail technician continues by taking hold of the packaging tray 220 and separating the compartment 223 along the perforation 233. After separating the compartment 223, the nail technician grasps the tab 254 of the cover 252 and pulls away from the lip 250 to remove the cover 252 and allow the nail technician access to the nail file contained within the compartment 223. The nail technician removes the nail file and uses it to shape and smooth the edges of the customer's nails. After smoothing and shaping the edges of the customer's nails, the nail technician disposes of the nail file and the compartment 223.

Following the disposal of the nail file and the compartment 223, the nail technician takes hold of the packaging tray 220 and separates the compartment 224 along the perforation 234. After separating the compartment 224, the nail technician grasps the tab 254 of the cover 252 and pulls away from the lip 250 to remove the cover 252 and allow the nail technician access to the buffer stone contained within the compartment 224. The nail technician removes the buffer stone and uses it to buff the customer's nails in order to prepare them for later application of nail polish. Once the buffing of the customer's nails is complete, the nail technician disposes of the buffer stone and the compartment 224.

After disposing of the buffer stone and the compartment 224, the nail technician takes hold of the packaging tray 220 and separates the compartment 225 along the perforation 235. Once the compartment 225 separates from the packaging tray 220, the nail technician grasps the tab 254 of the cover 252 and pulls away from the lip 250 to remove the cover 252 and allow the nail technician access to the cuticle oil contained within the compartment 225. The nail technician applies the cuticle oil to the customer's cuticles to fortify and strengthen the customer's cuticles. After applying cuticle oil to the customer's nails the nail technician will dispose of any remaining cuticle oil and the compartment 225.

Following the disposal of the compartment 225, the nail technician takes hold of the packaging tray 220 and separates the compartment 226 along the perforation 236. After separating the compartment 226, the nail technician grasps the tab 254 of the cover 252 and pulls away from the lip 250 to remove the cover 252 and allow the nail technician access to the callus remover lotion contained within the compartment 226. The nail technician applies the callus remover lotion to the customer's feet to remove any unwanted calluses from the customer's feet. Subsequent to applying callus remover lotion to the customer's feet, the nail technician disposes of any remaining callus remover lotion and the compartment 226.

After the nail technician disposes of the compartment 226, the nail technician takes hold of the packaging tray 220 and separates the compartment 227 along the perforation 237. Following the separating of the compartment 227, the nail technician grasps the tab 254 of the cover 252 and pulls away from the lip 250 to remove the cover 252 and allow the nail technician access to the pumice bar contained within the compartment 227. The nail technician uses the pumice bar to remove any calluses that remain on the customer's feet after application of the callus remover lotion. Once, the nail technician has removed any remaining calluses from the customer's feet, the nail technician disposes of the pumice bar and the compartment 227.

Subsequent to disposal of the pumice bar and the compartment 227, the nail technician takes hold of the packaging tray 220 and separates the compartment 228 along the perforation 238. Following the separating of the compartment 228, the nail technician grasps the tab 254 of the cover 252 and pulls away from the lip 250 to remove the cover 252 and allow the nail technician access to exfoliation crème contained within the compartment 228. The nail technician uses the exfoliation crème to smooth the customer's feet. Once, the nail technician has applied the exfoliation crème the customer's feet, the nail technician disposes of any remaining exfoliation crème and the compartment 228.

Following the disposal of the compartment 228, the nail technician takes hold of the packaging tray 220 and separates the compartment 229 along the perforation 239. After separating the compartment 229, the nail technician grasps the tab 254 of the cover 252 and pulls away from the lip 250 to remove the cover 252 and allow the nail technician access to the moisturizing lotion contained within the compartment 229. The nail technician applies the moisturizing lotion to the customer's feet to hydrate and soften the customer's feet. Subsequent to applying moisturizing lotion to the customer's feet, the nail technician disposes of any remaining moisturizing lotion and the compartment 229.

After the nail technician disposes of the compartment 229, the nail technician opens the remaining compartment 230 by grasping the tab 254 of the cover 252 and pulling away from the lip 250 to remove the cover 252 and allow the nail technician access to the oil remover contained within the compartment 230. The nail technician applies the oil remover to the customer's nails to remove oils and aid nail polish in adhering to the customer's nails. Once the oil remover is applied, the nail technician disposes of any remaining oil remover and the compartment 230, thereby completing the method and use of the third embodiment of the nail care system 200.

Although not required, an additional step may be performed in the manicure or pedicure process in which nail polish is added to the customer's nails after the application of oil remover. Furthermore, although the third embodiment describes a packaging tray 220 comprising individual compartments 221-230 that store the pedicure implements, any packaging system that comprises individual sections may be used.

FIGS. 17 and 18 illustrate a fourth embodiment of a nail care system 300 including a packet system 320. The nail care system 300 may be used in a manicure or pedicure process, however, in the fourth embodiment, the nail care system 300 will be employed in a pedicure process. The packet system 320 in the fourth embodiment is composed of individual packets 321-330 that connect together to form the packet system 320. One of ordinary skill in the art will recognize that more or less packets may be added or removed from the packet system 320 depending upon application. The packets 321-330 store implements used in a manicure or pedicure process and each includes a cover 350 and a border 351. The cover 350 and the border 351 form a pocket 352 which holds and secures a particular implement required in the manicure process within one of the packets 321-330. The packets 321-330 may contain any implement that is useful in the pedicure process such as a tool, cream, or oil. Furthermore, in the fourth embodiment of the nail care system 300, the packets 321-330 as well as the pedicure implements contained therein are disposable.

The covers 350 of the packets 321-330 are made of any suitable material such as plastic that can seal solid materials as well as liquids within the pocket 352 of the packets 321-330. Furthermore, the covers 350 of the packets 321-330 may be clear allowing a nail technician to see an implement contained within the packets 321-330 or opaque allowing the labeling of the packets 321-330.

The borders 351 of the packets 321-330 separate the various packets 321-330. In particular, the packets 321-330 of the packaging system 320 are individually sealed at the borders 351 and connect at perforations 331-339. Individually sealing the packets 321-330 at the borders 351 segregates the various pockets 352 of the packets 321-330. The segregation of the pockets 352 prevents implements contained within the packets 321-330 from commingling during shipping or transport. In addition, the borders 351 of the packets 321-330 each include a tab 354 that allows a nail technician to open a particular packet 321-330. To open the packets 321-330, a nail technician grasps the tab 354 and pulls away from the border 351 to open the packets 321-330 and allow the nail technician access to the implements contained within the pocket 352 of a particular packet 321-330 (identical to FIG. 9 in the second embodiment of the nail care system 100).

The perforations 331-339 allow the packets 321-330 to be separated from the packet system 320 and used when the particular implement contained therein is required in the pedicure process. To separate the packet 321 from the packet system 320, the nail technician would tear along the perforation 331 and remove the packet 321 from the packet system 320 (identical to FIG. 10 in the second embodiment of the nail care system 100).

The packet system 320 increases efficiency and decreases the time required to perform a pedicure by ensuring that the nail technician has all disposable implements necessary in the pedicure process in chronological order and readily available from the packet system 320. Specifically, the packet 321 of the nail care system 300 is the first packet used during the pedicure process. When needed in the pedicure process, the nail technician separates the packet 321 along the perforation 331 from the packet system 320 and then opens the packet 321 to access and employ the implement therein. The nail technician repeats the process of separating the remaining packets 322-329 in chronological order from the packet system 320 along perforations 332-329 and employing the pedicure implements contained therein until the packet 330 is the only remaining packet. Finally, the packet 330 is opened and the implement therein is employed in the pedicure process thereby completing the method and use of the fourth embodiment of the nail care system 300.

In addition to increasing the efficiency of the pedicure process, the fourth embodiment of the nail care system 300 also reduces the risk that infections will be transmitted through cross-contamination. As stated above, the packets 321-330 as well as the implements contained therein are disposed of after they are used in the pedicure process. This ensures that only one customer comes in contact with the fourth embodiment of the nail care system 300, thereby eliminating re-use and thus reducing the risk that infections will occur through cross-contamination.

The packet system 320 of the nail care system 300 may be manufactured such that the packets 321-330 and the pedicure implements contained therein are sterile. For example, the packet system 320 can be manufactured and assembled in a clean room or exposed to UV radiation after the manufacturing process, thereby ensuring the packet system 320 and the pedicure implements contained within the packets 321-330 are sterile.

Although the packets 321-330 in the fourth embodiment of the nail care system 300 are separated from the packet system 320 and used in chronological order, one of ordinary skill in the art will recognize that the packets 321-330 may be separated and used in any order desired by the nail technician. Furthermore, FIG. 19 illustrates an alternate embodiment of the nail care system 300 wherein the packets 321-330 are placed side by side.

It should be understood that the packet system 320 of the nail care system 300 may be manufactured so that the packets 321-330 include any implement that is useful in a pedicure process. Nevertheless, as an illustrative example and shown in FIG. 20, the packets 321-330 of the fourth embodiment of the nail care system 300 include a nail polish remover in packet 321, a cuticle softener lotion in the packet 322, a nail file in the packet 323, a buffer stone in the packet 324, cuticle oil in the packet 325, callus remover lotion in the packet 226, a pumice bar in the packet 227, exfoliation crème in the packet 228, lotion in the packet 229, and oil remover in the packet 230. In the fourth embodiment of the nail care system 300, the packets 321-330 are of equal size in order to aid the manufacturing process, however, one of ordinary skill in the art would recognize that the packets 321-330 and their corresponding pockets 352 may be different sizes to include multiple implements, increased quantity of implements, or decreased quantity of implements depending upon application. For example, the size of the packet 323 may be increased in size to include multiple nail files or the size of the packet 330 may be increased or decreased to include a greater or lesser quantity of oil remover.

The packet 321 includes a swab soaked in any suitable substance such as acetone that can remove nail polish present on a customer's nails. The packet 322 includes a cuticle softener lotion that softens and conditions the customer's cuticles. The packet 323 includes a nail file that is used to gently grind down and shape the edges of nails. The packet 324 includes a buffer stone which smoothes and polishes the customer's nail. The packet 325 includes cuticle oil that fortifies and strengthens a customer's nails. The packet 226 includes callus remover lotion that facilitates the removal of calluses on a customer's feet. The packet 227 includes the pumice bar that helps to remove any remaining calluses on the customer's feet after application of the callus remover lotion. The packet 228 includes exfoliation crème that helps to soften a customer's feet. The packet 229 includes massaging lotion that softens and moisturizes a customer's feet. The packet 230 includes an oil remover that removes oils and other substances that would prevent nail polish from adhering to a customer's nail.

Described hereafter is the preferred method of using the fourth embodiment of the nail care system 300 in a pedicure process to reduce the risk that infections are transmitted through cross-contamination. In a typical pedicure process the nail technician preps the customer's feet and nails by soaking the customer's feet and nails in warm water and trimming the customer's nails to the appropriate shape and length. After prepping the customer's feet and nails, the nail technician is ready to use the nail care system 300 in the pedicure process. The nail technician begins by taking hold of the packet system 320 and separating the packet 321 along the perforation 331.

The nail technician grasps the tab 354 of the packet 321 and pulls away from the border 351 to open the packet 321 and allow the nail technician access to nail polish remover (acetone swab) contained within the packet 121. The nail technician applies the nail polish remover (acetone swab) to the customer's nails removing any nail polish. Once the customer's nails are free of nail polish the nail technician disposes of the nail polish remover (acetone swab) and the packet 321.

Following the disposal of the nail polish remover and the packet 321, the nail technician then takes hold of the packet system 320 and separates the packet 322 along the perforation 332. After separating the packet 322, the nail technician grasps the tab 354 of the packet 322 and pulls away from the border 351 to open the packet 322 and allow the nail technician access to the cuticle softener lotion contained within the packet 322. The nail technician applies the cuticle softener lotion to the customer's cuticles to soften them. Once the cuticle softener lotion has been applied, the nail technician will dispose of the cuticle softener lotion and the packet 322. In a typical pedicure process after the application of the cuticle softener lotion, the nail technician removes any calluses or excess cuticles around the nail.

Once the nail technician has removed any calluses or excess cuticles the nail technician is ready to continue the use of the nail care system 300 in the pedicure process. The nail technician continues by taking hold of the packet system 320 and separating the packet 323 along the perforation 333. After separating the packet 323, the nail technician grasps the tab 354 of the packet 323 and pulls away from the border 351 to open the packet 323 allowing the nail technician access to the nail file contained within the packet 323. The nail technician removes the nail file and uses it to shape and smooth the edges of the customer's nails. After smoothing and shaping the edges of the customer's nails, the nail technician will dispose of the nail file and the packet 323.

Following the disposal of the nail file and the packet 323, the nail technician takes hold of the packet system 320 and separates the packet 324 along the perforation 334. After separating the packet 324, the nail technician grasps the tab 354 of the packet 324 and pulls away from the border 351 to open the packet 324 and allow the nail technician access to the buffer stone contained within the packet 324. The nail technician removes the buffer stone and uses it to buff the customer's nails in order to prepare them for later application of nail polish. Once the buffing of the customer's nails is complete, the nail technician disposes of the buffer stone and packet 324.

After disposing of the buffer stone and the packet 324, the nail technician takes hold of the packet system 320 and separates the packet 325 along the perforation 335. Once the packet 325 separates from the packet system 320, the nail technician grasps the tab 354 of the packet 324 and pulls away from the border 351 to open the packet 324 and allow the nail technician access to the cuticle oil contained within the packet 325. The nail technician applies the cuticle oil to the customer's cuticles to fortify and strengthen the customer's cuticles. After applying cuticle oil to the customer's nails the nail technician will dispose of any remaining cuticle oil and the packet 325.

Following the disposal of the packet 325, the nail technician takes hold of the packet system 320 and separates the packet 326 along the perforation 336. After separating the packet 326, the nail technician grasps the tab 354 of the packet 326 and pulls away from the border 351 to open the packet 326 and allow the nail technician access to the callus remover lotion contained within the packet 326. The nail technician applies the callus remover lotion to the customer's feet to remove any unwanted calluses from the customer's feet. Subsequent to applying callus remover lotion to the customer's feet, the nail technician disposes of any remaining callus remover lotion and the packet 326.

After the nail technician disposes of the packet 326, the nail technician takes hold of the packet system 320 and separates the packet 327 along the perforation 337. Following the separating of the packet 327, the nail technician grasps the tab 354 of the packet 327 and pulls away from the border 351 to open the packet 327 and allow the nail technician access to the pumice bar contained within the packet 327. The nail technician uses the pumice bar to remove any calluses that remain on the customer's feet after application of the callus remover lotion. Once, the nail technician has removed any remaining calluses from the customer's feet, the nail technician disposes of the pumice bar and the packet 327.

Subsequent to disposal of the pumice bar and the packet 327, the nail technician takes hold of the packet system 320 and separates the packet 328 along the perforation 338. Following the separating of the packet 328, the nail technician grasps the tab 354 of the packet 328 and pulls away from the border 351 to open the packet 328 and allow the nail technician access to exfoliation crème contained within the packet 328. The nail technician uses the exfoliation crème to smooth the customer's feet. Once, the nail technician has applied the exfoliation crème the customer's feet, the nail technician disposes of any remaining exfoliation crème and the packet 328.

Following the disposal of the packet 328, the nail technician takes hold of the packet system 320 and separates the packet 329 along the perforation 339. After separating the packet 329, the nail technician grasps the tab 354 of the packet 329 and pulls away from the border 351 to open the packet 329 and allow the nail technician access to the moisturizing lotion contained within the packet 329. The nail technician applies the moisturizing lotion to the customer's feet to hydrate and soften the customer's feet. After applying moisturizing lotion to the customer's feet, the nail technician will dispose of any remaining moisturizing lotion and the packet 329.

After the nail technician disposes of the packet 329, the nail technician opens the remaining packet 330 by grasping the tab 354 of the packet 330 and pulls away from the border 351 to open the packet 330 and allow the nail technician access to the oil remover contained within the packet 330. The nail technician applies the oil remover to the customer's nails to remove oils and aid nail polish in adhering to the customer's nails. After applying oil remover to the customer's nails the nail technician will dispose of the any remaining oil remover and the packet 330, thereby completing the method and use of the fourth embodiment of the nail care system 300.

Although not required, an additional step may be performed in the manicure or pedicure process in which nail polish is added to the customer's nails after the application of oil remover. Furthermore, although the fourth embodiment describes a packet system 320 comprising individual packets 321-330 that store the pedicure implements, any packaging system that comprises individual sections may be used.

Although the present invention has been described in terms of the foregoing preferred embodiments, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

The invention claimed is:

1. A nail care system designed for use in a manicure or pedicure process, comprising:
    an assembly of disposable tools, lotions, and oils required for a manicure or pedicure process; and
    a packaging system comprising disposable individual sections and a cover for each disposable individual section, wherein:
        the disposable individual sections are linked together in a chronological order of the disposable tools, lotions, and oils necessary to complete a manicure or a pedicure,
        each disposable individual section is adapted to hold therein one of a single chronologically ordered disposable tool, lotion, and oil of the assembly, further wherein each disposable individual section is adapted to receive its cover such that the cover seals the single chronologically ordered disposable tool, lotion, and oil of the assembly within the disposable individual section and prevents release of the single chronologically ordered disposable tool, lotion, and oil of the assembly from the disposable individual section, and
        the disposable individual sections are separable from the packaging system and unsealable through removal of its cover thereby providing access to a particular disposable tool, lotion, and oil sealed therein when the particular disposable tool, lotion, and oil is required in accordance with the chronological ordering of the disposable tools, lotions, and oils for the manicure or pedicure process, further wherein the particular disposable tool, lotion, and oil and the disposable individual section are disposed after use of the particular disposable tool, lotion, and oil sealed.

2. The nail care system according to claim 1, wherein the disposable tools, lotions, and oils for a manicure or pedicure process comprise nail polish remover, cuticle softener lotion, a nail file, a buffer stone, a cuticle oil, moisturizing lotion, and oil remover.

3. The nail care system according to claim 2, wherein the packaging system comprises first through seventh individual sections, further wherein:
    the first individual section is sized to include therein the nail polish remover in an amount for a single manicure or pedicure process,
    the second individual section is sized to include therein the cuticle softener lotion in an amount for a single manicure or pedicure process,
    the third individual section is sized to include therein the nail file for a single manicure or pedicure process,
    the fourth individual section is sized to include therein the buffer stone, the fifth individual section is sized to include therein the cuticle oil in an amount for a single manicure or pedicure process, the sixth individual section is sized to include therein the moisturizing lotion in an amount for a single manicure or pedicure process, and the seventh individual section is sized to include therein the oil remover in an amount for a single manicure or pedicure process.

4. The nail care system according to claim 1, wherein the disposable tools, lotions, and oils for a manicure or pedicure process comprise nail polish remover, cuticle softener lotion, a nail file, a buffer stone, a cuticle oil, callus remover lotion, pumice bar, exfoliation crème, moisturizing lotion, and oil remover.

5. The nail care system according to claim 4, wherein the packaging system comprises first through tenth individual sections, further wherein:

the first individual section is sized to include therein the nail polish remover in an amount for a single manicure or pedicure process, the second individual section is sized to include therein the cuticle softener lotion in an amount for a single manicure or pedicure process, the third individual section is sized to include therein the nail file for a single manicure or pedicure process, the fourth individual section is sized to include therein the buffer stone for a single manicure or pedicure process, the fifth individual section is sized to include therein the cuticle oil in an amount for a single manicure or pedicure process, the sixth individual section is sized to include therein the callus remover lotion for a single manicure or pedicure process, the seventh individual section is sized to include therein the pumice bar for a single manicure or pedicure process, the eighth individual section is sized to include therein the exfoliation crème in an amount for a single manicure or pedicure process, the ninth individual section is sized to include therein the moisturizing lotion in an amount for a single manicure or pedicure process, and the tenth individual section is sized to include therein the oil remover in an amount for a single manicure or pedicure process.

6. The nail care system of claim 1, wherein the packaging system is a packaging tray and the individual sections are compartments comprising:

a container that provides storage space and is adapted to hold one of a particular disposable tool, lotion, and oil useful in a manicure or pedicure process;

a lip formed integrally about the compartment, wherein the lip segregates one compartment from another and includes a perforation that allows a compartment to be separated from the packaging tray; and the cover is adapted to seal one of a particular disposable tool, lotion, and oil within the compartment, wherein the cover includes a tab that allows the cover to be opened from the compartment and a user to gain access to the particular disposable tool, lotion, and oil stored therein.

7. The nail care system of claim 1, wherein the packaging system is a packet system and the individual sections are packets comprising the cover and a border that form a pocket, wherein:

the pocket provides a storage space and is adapted to hold one of a particular disposable tool, lotion, and oil useful in a manicure or pedicure process, the border segregates one packet from another and includes a perforation that allows a packet to be separated from the packet system, and the border includes a tab that allows the cover to be opened and a user to gain access to the particular disposable tool, lotion, and oil stored within the pocket.

* * * * *